March 17, 1925.  1,530,436

R. D. STROUT

FAN

Filed Oct. 13, 1923

R. D. Strout
INVENTOR

BY Victor J. Evans
ATTORNEY

Patented Mar. 17, 1925.

1,530,436

UNITED STATES PATENT OFFICE.

RAY D. STROUT, OF LA SALLE, ILLINOIS.

FAN.

Application filed October 13, 1923. Serial No. 668,402.

*To all whom it may concern:*

Be it known that I, RAY D. STROUT, a citizen of the United States, residing at La Salle, in the county of La Salle and State of Illinois, have invented new and useful Improvements in Fans, of which the following is a specification.

This invention relates to a fan structure and has for its primary object the construction of a fan in which the blades are adjustably mounted so as to change the inclination thereof at will.

An object of the invention is the construction of a fan that when used in a cooling system of an automobile may be adjusted to regulate the cooling effect thereof.

Besides the above my invention is distinguished in the novel independent means for independently adjusting each blade.

With these and other objects in view the invention will be better understood from the following detailed description taken in connection with the accompanying drawing wherein.

Figure 1:
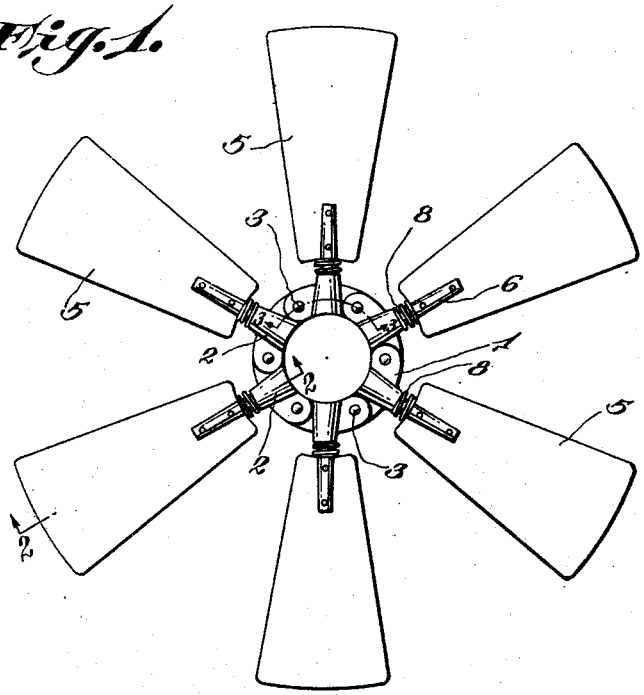
Fig. 1 is a front elevation of a fan constructed in accordance with my invention.
Figure 2:
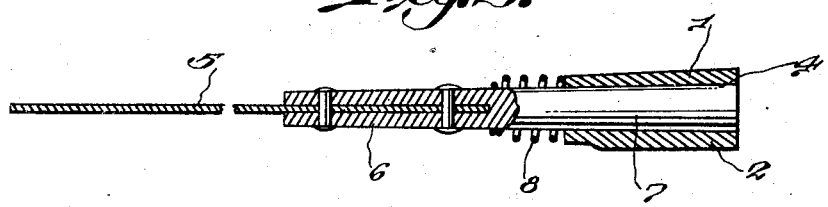
Fig. 2 is a sectional view on the line 2—2 of Fig. 1.
Figure 3:
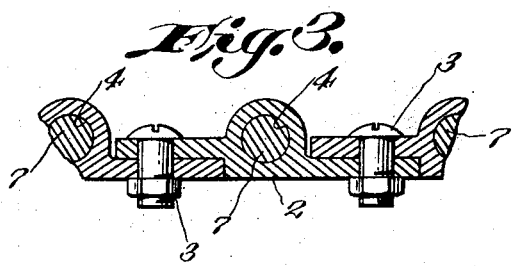
Fig. 3 is a sectional view through the hub on the line 3—3 of Fig. 1.

Again referring to the drawing illustrating one of the many constructions of my invention the numeral 1 designates a hub constructed from a plurality of sockets 2 bolted together as indicated at 3. Each socket is provided with a tapered bore 4. The sockets 2 have formed upon opposite sides thereof laterally projecting arcuate ears which overlap the ears of the adjacent socket and the bolts 3 are passed through the ears to hold the sockets in circular alignment. Each blade 5 has attached thereto a shank 6 that has a tapered portion 7 fitting in the bore 4, so that when the shank is moved in one direction tight binding action will be brought about between the shank and bore; when the shank is moved in the opposite direction the shank may be readily adjusted in the bore. Any suitable means may be utilized for bringing about binding action of the shank with the bore but I have found a great advantage in the use of springs 8 which bind against the blade and sockets and exert pressure in a direction to draw the shank into tight engagement with the wall of the bore. From this construction it will be seen it is only necessary to exert pressure on each blade towards the axis of the hub to release the shank from the wall of the bore for adjustment and when proper adjustment has been made it is only necessary to release the blade as the expansive action of the spring will bring the shank into tight engagement with the wall of the bore.

From the foregoing description taken in connection with the accompanying drawing it will be apparent that I provide a fan, the blades of which may be easily and readily adjusted and regulate the action of the fan.

It is, of course, to be understood that the invention may be constructed in various other manners and the parts associated in different relations and, therefore, I do not desire to be limited in any manner except as set forth in the claim hereunto appended.

Having thus described my invention what I claim is:

A fan construction comprising a hub including a plurality of sockets, laterally projecting arcuate ears formed upon opposite sides of said sockets, said ears being perforated and adapted to overlap each other to position the sockets in circular alignment, securing members passed through the ears for retaining the sockets in circular alignment whereby each socket will extend radially relative to the center of the hub, each socket having a tapering bore therein, a shank having a tapered portion mounted within said bore and a blade carried by the outer end of said shank.

In testimony whereof I affix my signature.

RAY D. STROUT.